(12) United States Patent
Baba et al.

(10) Patent No.: US 11,325,577 B2
(45) Date of Patent: May 10, 2022

(54) ON-BOARD CONTROLLER AND METHOD FOR CONTROLLING VEHICLE

(71) Applicant: TOYOTA JIDOSHA KABUSHIKI KAISHA, Toyota (JP)

(72) Inventors: Masayuki Baba, Toyota (JP); Takashi Moriya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 16/751,282

(22) Filed: Jan. 24, 2020

(65) Prior Publication Data

US 2020/0262412 A1 Aug. 20, 2020

(30) Foreign Application Priority Data

Feb. 14, 2019 (JP) .............................. JP2019-024456

(51) Int. Cl.
  *B60W 20/40* (2016.01)
  *B60W 10/196* (2012.01)
  (Continued)

(52) U.S. Cl.
  CPC ........ *B60W 10/196* (2013.01); *B60W 10/023* (2013.01); *B60W 10/08* (2013.01);
  (Continued)

(58) Field of Classification Search
  CPC ............... B60W 10/023; B60W 20/40; B60W 2710/081; B60W 2520/04; B60W 10/30;
  (Continued)

(56) References Cited

U.S. PATENT DOCUMENTS

2011/0070999 A1* 3/2011 Soliman .............. B60W 30/192
                                                           477/3
2016/0297425 A1   10/2016 Sato et al.
(Continued)

FOREIGN PATENT DOCUMENTS

JP    2013204625 A  * 10/2013
JP    2016-199155 A   12/2016
(Continued)

*Primary Examiner* — Roger L Pang
(74) *Attorney, Agent, or Firm* — Oblon, McClelland, Maier & Neustadt, L.L.P.

(57) ABSTRACT

An on-board controller executes a torque reduction process that reduces torque generated by an electric motor when a brake pedal of a vehicle is depressed and the vehicle is stopped during motor creep driving. When a start request for an internal combustion engine is issued, the on-board controller executes an engine start process that sets a clutch mechanism to an engagement state, which engages an output shaft of the internal combustion engine with an output shaft of the electric motor, and drives the electric motor to perform cranking. When a state in which the clutch mechanism is maintained immediately before the engagement state is defined as an engagement preparation state, the on-board controller executes a preparation process that applies hydraulic pressure to the clutch mechanism during execution of the torque reduction process so that the clutch mechanism is set to the engagement preparation state.

11 Claims, 9 Drawing Sheets

(51) Int. Cl.
  *H02K 7/00*    (2006.01)
  *B60W 10/02*   (2006.01)
  *B60W 10/08*   (2006.01)
  *B60W 10/30*   (2006.01)
(52) U.S. Cl.
  CPC ............ *B60W 20/40* (2013.01); *H02K 7/006* (2013.01); *B60W 10/30* (2013.01); *B60W 2510/081* (2013.01); *B60W 2510/10* (2013.01); *B60W 2520/04* (2013.01)
(58) Field of Classification Search
  CPC ........... B60W 2710/083; B60W 10/02; B60W 30/18063; B60W 10/60; B60W 10/08; B60W 2510/10; B60W 2510/081
  See application file for complete search history.

(56) References Cited

U.S. PATENT DOCUMENTS

2016/0311438 A1* 10/2016 Wang .................... B60W 10/08
2018/0094722 A1*  4/2018 Katakura ............ F16H 61/0028
2021/0171014 A1*  6/2021 Blue ........................ B60K 6/48

FOREIGN PATENT DOCUMENTS

JP   2018-065399 A    4/2018
KR   20140028632 A *  3/2014

* cited by examiner

ON-BOARD CONTROLLER AND METHOD FOR CONTROLLING VEHICLE

CROSS-REFERENCE TO RELATED APPLICATIONS

This application claims priority to Japan Patent Application No. 2019-024456, filed Feb. 14, 2019, and the entire contents of the above application is hereby incorporated herein by reference in entirety.

FIELD

The present disclosure relates to an on-board controller and a method for controlling a vehicle.

DESCRIPTION OF RELATED ART

Japanese Laid-Open Patent Publication No. 2018-65399 discloses an example of a vehicle including an internal combustion engine and an electric motor as prime movers and including a clutch mechanism. When the clutch mechanism is in an engagement state, the clutch mechanism engages the output shaft of the internal combustion engine with the output shaft of the electric motor. When the clutch mechanism is in a disengagement state, the clutch mechanism disengages the output shaft of the internal combustion engine from the output shaft of the electric motor.

In this vehicle, even when the running of the internal combustion engine is stopped, a motor creep driving, which sets the clutch mechanism to the disengagement state and causes the electric motor to generate torque for creeping, is performed so that the vehicle performs creep driving, which causes the vehicle to travel at low speeds.

In addition, in the vehicle described above, when the brake pedal of the vehicle is depressed and the vehicle is stopped during the motor creep driving, a torque reduction process is executed to reduce the torque generated by the electric motor so that power consumption of the electric motor is reduced.

When the vehicle includes a hydraulic clutch mechanism, the electric motor may drive an oil pump that applies hydraulic pressure to the clutch mechanism. In this case, when the torque reduction process is executed in the vehicle that drives the oil pump with the electric motor, the following problem may occur.

More specifically, in the above-described vehicle, when a request for starting the internal combustion engine is issued, an engine start process, which sets the clutch mechanism to the engagement state and drives the electric motor to perform cranking, is executed. During execution of the torque reduction process, the torque generated by the electric motor is reduced. Accordingly, the rotation speed of the oil pump is reduced, and the hydraulic pressure is lowered. Thus, when the engine is started after the torque reduction process is executed, the application of the hydraulic pressure to the clutch mechanism may be insufficient until the rotation speed of the electric motor is sufficiently increased. In such a case, prompt engagement of the clutch mechanism is hindered, and the engine may not be promptly started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above problem, an aspect provides an on-board controller configured to be mounted on a vehicle. The vehicle includes an internal combustion engine and an electric motor as prime movers, a hydraulic clutch mechanism, and an oil pump driven by the electric motor and configured to apply hydraulic pressure to the clutch mechanism. In an engagement state, the clutch mechanism engages an output shaft of the internal combustion engine with an output shaft of the electric motor. In a disengagement state, the clutch mechanism disengages the output shaft of the internal combustion engine from the output shaft of the electric motor. The on-board controller is configured to execute an engine start process that sets the clutch mechanism to the engagement state and drives the electric motor to perform cranking when a start request for the internal combustion engine is issued. The on-board controller is configured to execute a process that sets the clutch mechanism to the disengagement state and causes the electric motor to generate torque for creep driving to perform motor creep driving. The on-board controller is configured to execute a torque reduction process that reduces torque generated by the electric motor when a brake pedal of the vehicle is depressed and the vehicle is stopped during the motor creep driving. The on-board controller is configured to execute a preparation process that applies hydraulic pressure to the clutch mechanism during execution of the torque reduction process so that the clutch mechanism is set to an engagement preparation state. A state in which the clutch mechanism is maintained immediately before the engagement state is defined as the engagement preparation state.

With this configuration, during execution of the torque reduction process, the clutch mechanism is controlled so that the clutch mechanism is in the engagement preparation state. Thus, when shifting the clutch mechanism from the disengagement state to the engagement state based on the request for starting the internal combustion engine, the clutch mechanism promptly engages. This allows the engine to be promptly started even when the torque reduction process is executed.

When a specified creep restoration condition is satisfied during execution of the torque reduction process, the on-board controller may be configured to execute a restoration process that increases torque generated by the electric motor to be greater than torque generated during execution of the torque reduction process. When the start request is issued after execution of the restoration process, the on-board controller may be configured to execute an engagement process that shifts the clutch mechanism from the engagement preparation state to the engagement state when a rotation speed of the electric motor becomes greater than or equal to a specified threshold value.

With this configuration, when the restoration process is executed to increase the rotation speed of the electric motor, the rotation speed of the oil pump, which is driven by the electric motor, is also increased. When the rotation speed of the electric motor is greater than or equal to the specified threshold value, the oil pump performs the rated operation. Thus, hydraulic pressure that shifts the clutch mechanism from the engagement preparation state to the engagement state is stably ensured. This configuration ensures the engagement of the clutch mechanism that is needed when starting the engine.

After execution of the restoration process, when a rotation speed of the electric motor becomes greater than or equal to the threshold value and the start request is not issued, the on-board controller may be configured to execute a hydraulic pressure reduction process that reduces hydraulic pressure applied to the clutch mechanism.

With this configuration, when the request for starting the internal combustion engine is not issued and the clutch mechanism does not have to be in the engagement state, the hydraulic pressure applied to the clutch mechanism is reduced. Thus, energy loss corresponding to the driving of the oil pump is reduced as compared to a case in which the hydraulic pressure applied to the clutch mechanism is not reduced and the engagement preparation state of the clutch mechanism is maintained.

The on-board controller may be configured to execute a process that prohibits quick-apply control, which is executed when engaging the clutch mechanism, until a specified time elapses from when the hydraulic pressure reduction process is executed.

When shifting the clutch mechanism from the disengagement state to the engagement state, quick-apply control that temporarily increases the hydraulic pressure applied to the clutch mechanism may be executed so that the hydraulic oil is promptly supplied to the clutch mechanism.

In this case, a certain amount of the hydraulic pressure remains in the clutch mechanism until a certain amount of time elapses from when the hydraulic pressure reduction process is executed. If the quick-apply control is executed with the pressure remaining, the transmission torque capacity of the clutch mechanism may be overly increased, and a shock may occur when engaging the clutch mechanism. In this regard, in the present embodiment, execution of the quick-apply control is prohibited until the specified time elapses from when the hydraulic pressure reduction process is executed. This limits occurrence of shocks when engaging the clutch mechanism.

The vehicle may include an electric oil pump that applies hydraulic pressure to the clutch mechanism. The on-board controller may be configured to execute a process that drives the electric oil pump to maintain the engagement preparation state and when an engine start is completed based on the start request, stop the electric oil pump.

In general, when the electric oil pump is stopped before completion of the engine start, the hydraulic pressure applied to the clutch mechanism is reduced. This causes the engagement state of the clutch mechanism to become unstable and may, for example, fail to stably start the engine. In this regard, with the configuration described above, when the engine start is completed, the electric oil pump is stopped. This reduces situations in which the engagement state of the clutch mechanism becomes unstable.

In the on-board controller, the torque reduction process may include a process that reduces a rotation speed of the electric motor to a rotation speed that allows the oil pump to generate a hydraulic pressure that maintains the engagement preparation state, and reduces torque generated by the electric motor to a torque that maintains the reduced rotation speed.

With this configuration, when the torque reduction process is executed, the engagement preparation state of the clutch mechanism is maintained.

The on-board controller may be configured to execute a starting time setting process that sets a starting time of the preparation process based on a deceleration of the vehicle so that the clutch mechanism is in the engagement preparation state at a point in time when the vehicle stops.

With this configuration, the clutch mechanism is in the engagement preparation state at a point in time when the vehicle stops. This allows the torque reduction process to be immediately executed at the point in time when the vehicle stops, as compared to a case in which execution of the torque reduction process is deferred from when the vehicle stops until the clutch mechanism is set to the engagement preparation state. This earlier start of the torque reduction process, for example, reduces power consumption of the electric motor while the vehicle is stopped.

The vehicle may include a transmission that performs a transmission operation using hydraulic pressure of the oil pump driven by the electric motor. The on-board controller may be configured to prohibit execution of the preparation process when it is assumed that the transmission performs a transmission operation in a period from the starting time to when the vehicle stops.

In general, in a period from the starting time to when the vehicle stops, if the preparation process is executed when the transmission performs a transmission operation, the hydraulic pressure may become insufficient for the transmission operation of the transmission, and the transmission operation may not be appropriately performed. In this regard, with the configuration described above, when it is assumed that the transmission performs a transmission operation in a period from the starting time to when the vehicle stops, execution of the preparation process is prohibited before the stopping of the vehicle. This ensures sufficient hydraulic pressure for the transmission operation of the automatic transmission. With this configuration, for example, when the transmission stage of the automatic transmission at the starting time differs from the transmission stage at the time when the vehicle is at a standstill, it is determined that the automatic transmission performs a transmission operation in a period from the starting time to when the vehicle stops.

The on-board controller may be configured to execute a determination process that determines, during deceleration of the vehicle, whether a prohibition condition that prohibits execution of the torque reduction process is satisfied when the vehicle is stopped. When the determination process determines that the prohibition condition is satisfied when the vehicle is stopped, the on-board controller may be configured to prohibit execution of the preparation process.

When the torque reduction process is not executed when the vehicle stops, hydraulic pressure of the oil pump is ensured even when the vehicle is stopped. Thus, the preparation process does not have to be executed. With the configuration described above, if it is determined that the prohibition condition of the torque reduction process is satisfied when the vehicle is stopped, the on-board controller prohibits execution of the preparation process. This limits unnecessary execution of the preparation process.

In the above configuration, the prohibition condition may be, for example, set to a case in which the running of the internal combustion engine is stopped during the motor driving and the internal combustion engine is highly likely to be promptly started after the vehicle is stopped. An example of a case in which the engine is highly likely to be promptly started after the vehicle is stopped includes a case in which the state of charge in a battery mounted on the vehicle to drive the vehicle has a value proximate to the charge need value.

Another aspect provides a method for controlling a vehicle. The vehicle includes an internal combustion engine and an electric motor as prime movers, a hydraulic clutch mechanism, and an oil pump driven by the electric motor and configured to apply hydraulic pressure to the clutch mechanism. In an engagement state, the clutch mechanism engages an output shaft of the internal combustion engine with an output shaft of the electric motor. In a disengagement state, the clutch mechanism disengages the output shaft of the internal combustion engine from the output shaft of the electric motor. The method includes an engine start process that sets the clutch mechanism to the engagement state and drives the electric motor to perform cranking when a start request for the internal combustion engine is issued. The method includes a process that sets the clutch mechanism to the disengagement state and causes the electric motor to generate torque for creep driving to perform motor creep driving. The method includes a torque reduction process that reduces torque generated by the electric motor when a brake pedal of the vehicle is depressed and the vehicle is stopped during the motor creep driving. The method includes a preparation process that applies hydraulic pressure to the clutch mechanism during execution of the torque reduction process so that the clutch mechanism is set to an engagement preparation state. A state in which the clutch mechanism is maintained immediately before the engagement state is defined as the engagement preparation state.

Another aspect provides an on-board controller configured to be mounted on a vehicle. The vehicle includes an internal combustion engine and an electric motor as prime movers, a hydraulic clutch mechanism, and an oil pump driven by the electric motor and configured to apply hydraulic pressure to the clutch mechanism. In an engagement state, the clutch mechanism engages an output shaft of the internal combustion engine with an output shaft of the electric motor. In a disengagement state, the clutch mechanism disengages the output shaft of the internal combustion engine from the output shaft of the electric motor. The on-board controller includes processing circuitry configured to execute an engine start process that sets the clutch mechanism to the engagement state and drives the electric motor to perform cranking when a start request for the internal combustion engine is issued. The processing circuitry is configured to execute a process that sets the clutch mechanism to the disengagement state and causes the electric motor to generate torque for creep driving to perform motor creep driving. The processing circuitry is configured to execute a torque reduction process that reduces torque generated by the electric motor when a brake pedal of the vehicle is depressed and the vehicle is stopped during the motor creep driving. The processing circuitry is configured to execute a preparation process that applies hydraulic pressure to the clutch mechanism during execution of the torque reduction process so that the clutch mechanism is set to an engagement preparation state. In a state in which the clutch mechanism is maintained immediately before the engagement state is defined as the engagement preparation state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of an on-board controller will now be described with reference to FIGS. 1 to 3.

Figure 1:
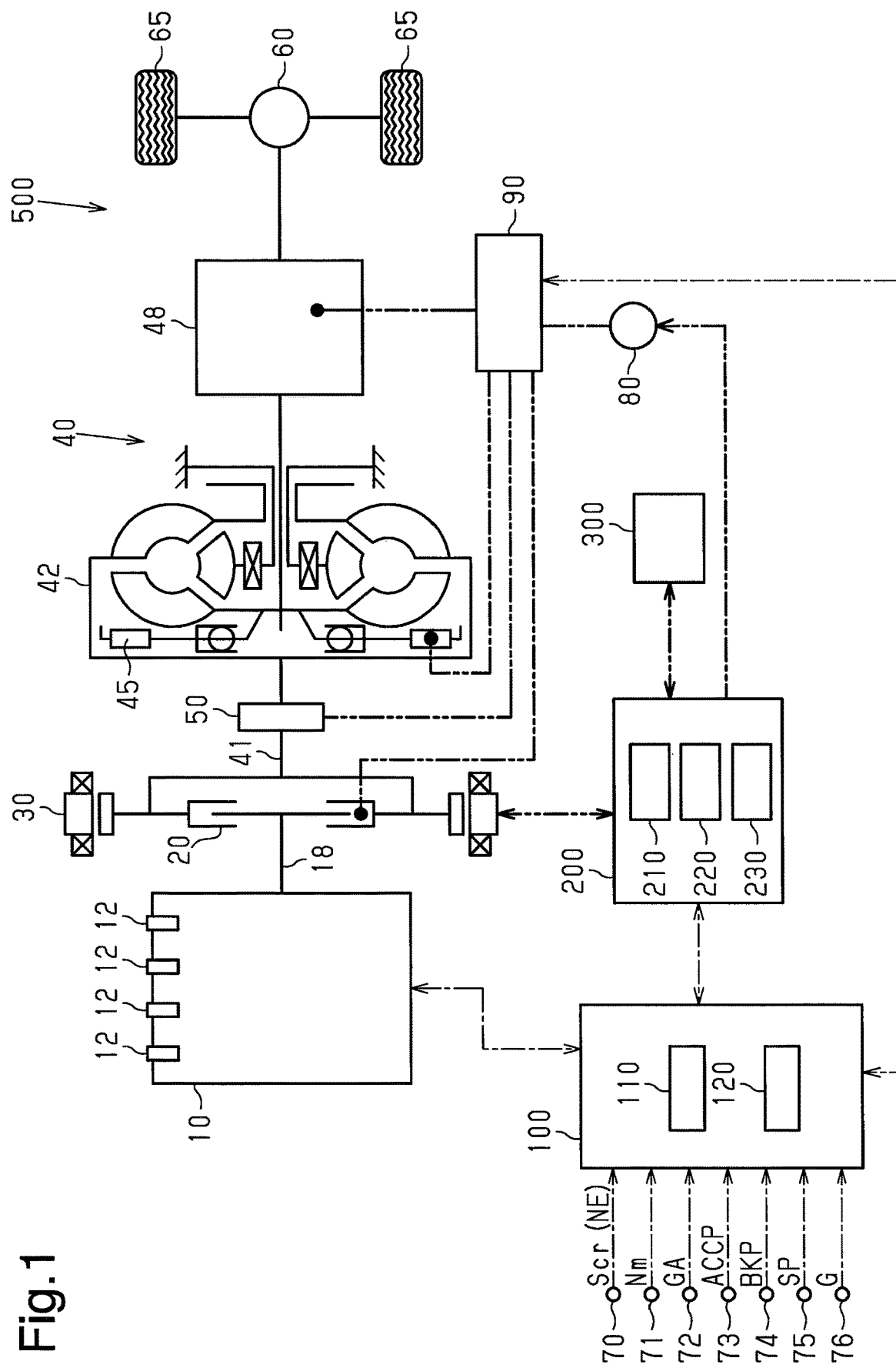
FIG. 1 is a schematic diagram of a vehicle including a first embodiment of an on-board controller.

As shown in FIG. 1, a vehicle 500 includes two prime movers, namely, an internal combustion engine 10 and an electric motor 30. The internal combustion engine 10 includes fuel injection valves 12 that supplies fuel to cylinders. The internal combustion engine 10 includes combustion chambers into which air is drawn, and the mixture of the drawn air and the fuel injected from the fuel injection valve 12 is burned to obtain engine output.

A crankshaft 18, that is, the output shaft of the internal combustion engine 10, is connected to an output shaft 41 of the electric motor 30 by a hydraulic clutch mechanism 20. An oil pump 50 is disposed on the output shaft 41 and driven by the electric motor 30.

When the clutch mechanism 20 is in the engagement state, the crankshaft 18 engages with the output shaft 41 of the electric motor 30. When the clutch mechanism 20 is in the disengagement state, the crankshaft 18 is disengaged from the output shaft 41 of the electric motor 30.

The electric motor 30 supplies and receives power to and from a high voltage battery 300 for driving the vehicle through a power control unit (PCU) 200. The PCU 200 includes a boost converter 210 that increases direct current voltage received from the high voltage battery 300 and outputs the increased voltage, an inverter 220 that converts the direct current voltage increased by the boost converter 210 into alternating current voltage and sends the alternating current voltage to the electric motor 30, and a DC-DC converter 230 that reduces the direct current voltage of the high voltage battery 300 to a voltage for driving auxiliary devices. The PCU 200 detects a charge state SOC of the high voltage battery 300. The charge state SOC is expressed by amount of charge in battery [Ah]/capacity of the battery [Ah]×100%.

The output shaft of the electric motor 30 is connected to the input shaft of an automatic transmission 40. The automatic transmission 40 includes a torque converter 42 having a lockup clutch 45 and a transmission unit 48 that changes the transmission ratio. The output shaft of the automatic transmission 40 is connected to a differential gear 60. The output shaft of the differential gear 60 is connected to drive wheels 65 of the vehicle 500.

Transmission operation of the transmission unit 48 of the automatic transmission 40, actuation of the lockup clutch 45, and actuation of the clutch mechanism 20 are performed by controlling a hydraulic circuit 90, which is supplied with hydraulic oil from the oil pump 50. The vehicle 500 further includes an electric oil pump 80 that applies hydraulic pressure to the transmission unit 48, the lockup clutch 45, and the clutch mechanism 20 through the hydraulic circuit 90.

An on-board controller 100 (hereafter, referred to as controller) is mounted on the vehicle 500 to execute various types of control such as control of the internal combustion engine 10, control of the electric motor 30, and control of the hydraulic circuit 90, which controls the automatic transmission 40 and the clutch mechanism 20.

The controller 100 includes a central processing unit 110 (hereinafter, referred to as CPU) and a memory 120 storing programs and data that are used in control. The CPU 110 executes the programs stored in the memory 120 to execute various types of control. Although not shown in the drawings, the controller 100 is configured by multiple control units including a control unit for the internal combustion engine and a control unit for the PCU.

The controller 100 is connected to a crank angle sensor 70 that detects a rotation angle of the crankshaft 18, a rotation speed sensor 71 that detects a motor rotation speed Nm, that is, a rotation speed of the electric motor 30, and an airflow meter 72 that detects an intake air amount GA of the internal combustion engine 10. Output signals from these various sensors are input to the controller 100. The controller 100 is also connected to an accelerator position sensor 73 that detects an accelerator operation amount ACCP, which is an operated amount of the accelerator pedal, and a brake sensor 74 that detects a brake operation amount BKP, which is an operated amount of the brake pedal. Output signals from these various sensors are input to the controller 100. The controller 100 is also connected to a vehicle speed sensor 75 that detects a vehicle speed SP of the vehicle 500 and an acceleration sensor 76 that detects acceleration G of the vehicle 500. Output signals from these various sensors are input to the controller 100. The controller 100 calculates an engine rotation speed NE based on an output signal Scr of the crank angle sensor 70. The controller 100 calculates an engine load factor KL based on the engine rotation speed NE and the intake air amount GA.

The controller 100 causes the vehicle 500 to travel in one of a motor drive mode, a hybrid drive mode, and an engine drive mode. In the motor drive mode, the controller 100 releases the clutch mechanism 20 and rotates the drive wheels 65 with driving power of the electric motor 30. In the hybrid drive mode, the controller 100 engages the clutch mechanism 20 and rotates the drive wheels 65 with driving power of the internal combustion engine 10 and the electric motor 30. In the engine drive mode, the controller 100 engages the clutch mechanism 20 and rotates the drive wheels 65 with driving power of the internal combustion engine 10.

The controller 100 is configured, when a request for starting the internal combustion engine 10 is issued, to execute an engine start process that sets the clutch mechanism 20 to the engagement state and drives the electric motor 30 to perform cranking. Examples of cases in which the start request is issued include a case in which torque of the electric motor 30 alone cannot provide the requested torque for driving the vehicle and a case in which a request for charging the high voltage battery 300 is generated when the running of the internal combustion engine 10 is stopped.

In addition, the controller 100 is configured to perform a motor creep driving so that the vehicle 500 travels at low speeds even when the driver of the vehicle does not operate the accelerator (when the accelerator operation amount is zero). To perform the motor creep driving, the controller 100 executes a process that sets the clutch mechanism 20 to the disengagement state and generates torque for the creep driving from the electric motor 30. In addition, from when the vehicle 500 is stopped during the motor creep driving to when a torque reduction process, which is described later, is started, the motor rotation speed Nm of the electric motor 30 is maintained to be a pump actuation assurance value Nmp, which is a request value of the motor rotation speed Nm that allows for a rated operation of the oil pump 50.

Figure 2:
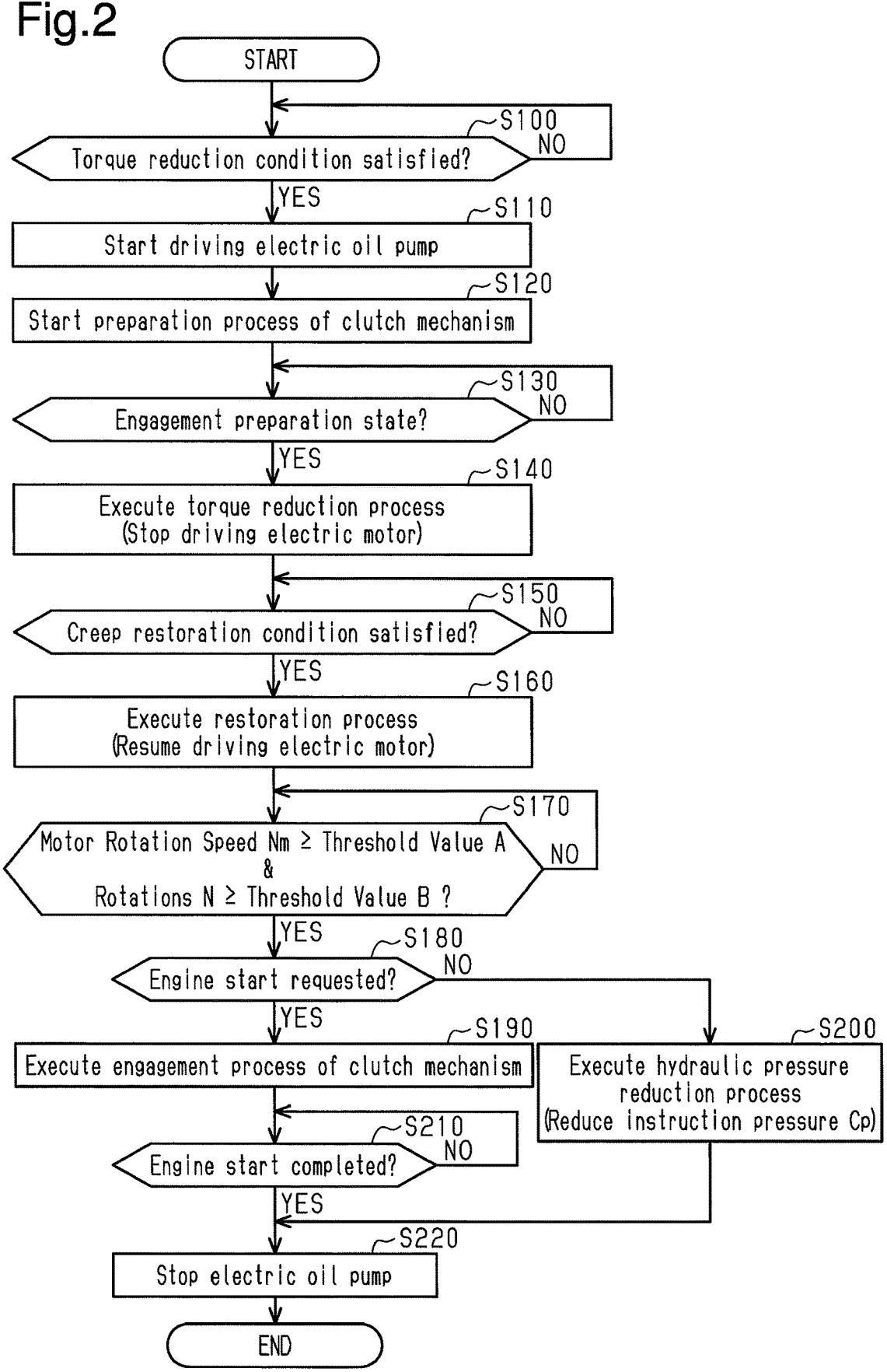
FIG. 2 is a flowchart showing the procedures of a process executed by the on-board controller of the embodiment.

When the motor creep driving is started, the controller 100 also starts a series of processes shown in FIG. 2. In the following description, the number of each step is represented by the letter S followed by a numeral.

When starting the series of processes shown in FIG. 2, the controller 100 determines whether a torque reduction condition is satisfied (S100). The torque reduction condition is a condition for executing the torque reduction process that reduces torque that is generated by the electric motor 30 for the motor creep driving to zero. In the present embodiment, when the brake pedal of the vehicle 500 is depressed and the vehicle 500 is stopped during the motor creep driving, it is determined that the torque reduction condition is satisfied.

During the motor creep driving, the controller 100 repeatedly executes the process of S100 until the torque reduction condition is satisfied.

If it is determined that the torque reduction condition is satisfied (S100: YES), the controller 100 starts to drive the electric oil pump 80 (S110) and starts a preparation process of the clutch mechanism 20 (S120). A state in which the clutch mechanism 20 is maintained immediately before the engagement state is defined as an engagement preparation state. The preparation process applies the hydraulic pressure to the clutch mechanism 20 so that the clutch mechanism 20 is set to the engagement preparation state. In the present embodiment, the engagement preparation state refers to a state in which friction engaging members of the clutch mechanism 20 are in contact with each other and the transmission torque capacity is substantially zero. However, the engagement preparation state may be any state as long as the clutch mechanism 20 is in the state immediately before the engagement state. For example, the engagement preparation state may be a state in which the friction engaging members of the clutch mechanism 20 are closer to each other than when no hydraulic pressure is applied to the clutch mechanism 20 and the transmission torque capacity is zero.

When starting the preparation process, the controller 100 temporarily increases an instruction pressure Cp, which is a target value of hydraulic pressure applied to the clutch mechanism 20, to an apply pressure AP, which is used to execute a quick-apply control. The quick-apply control is a known control that temporarily increases the hydraulic pressure applied to the clutch mechanism so that when changing the clutch mechanism from the disengagement state to the engagement state, the hydraulic oil is promptly supplied to the clutch mechanism. After the instruction pressure Cp is maintained to be the apply pressure AP for a specified amount of time, the controller 100 reduces the instruction pressure Cp to a preparation pressure PP that allows the clutch mechanism 20 to maintain the engagement preparation state.

Next, the controller 100 determines whether the clutch mechanism 20 has shifted from the disengagement state to the engagement preparation state (S130). In S130, if the time elapsed from when the preparation process is started is greater than or equal to a predetermined specified time PD, the controller 100 determines that the clutch mechanism 20 has shifted to the engagement preparation state. The controller 100 repeatedly executes the process of S130 until it is determined that the clutch mechanism 20 has shifted to the engagement preparation state.

If it is determined that the clutch mechanism 20 has shifted to the engagement preparation state (S130: YES), the controller 100 executes the torque reduction process to stop the driving of the electric motor 30 (S140).

The controller 100 determines whether a creep restoration condition is satisfied during execution of the torque reduction process (S150). The creep restoration condition is a condition for executing a restoration process that increases torque generated by the electric motor 30 to be greater than that generated during execution of the torque reduction process. In the present embodiment, for example, when the brake pedal is released from depression, that is, when the brake operation amount BKP is changed to zero, the controller 100 determines that the creep restoration condition is satisfied.

During execution of the torque reduction process, the controller 100 repeatedly executes the process of S150 until the creep restoration condition is satisfied.

If it is determined that the creep restoration condition is satisfied (S150: YES), the controller 100 executes the restoration process to resume driving the electric motor 30 (S160).

The controller 100 determines whether the motor rotation speed Nm of the electric motor 30, which has resumed driving, is greater than or equal to a specified threshold value A and the number of rotations N of the electric motor 30 since execution of the restoration process is greater than or equal to a specified threshold value B (S170). The threshold value A is set to the pump actuation assurance value Nmp. The threshold value B is set to the value described below.

More specifically, when the oil pump 50 is stopped, the hydraulic oil drains from the oil pump 50 and the clutch mechanism 20. Thus, even when the driving of the oil pump 50 is resumed and the motor rotation speed Nm is greater than or equal to the threshold value A, the hydraulic pressure applied to the clutch mechanism 20 may remain low until the oil pump 50 and the clutch mechanism 20 are filled with the hydraulic oil. In this regard, the number of rotations of the electric motor 30 needed from when the restoration process is executed to when the oil pump 50 and the clutch mechanism 20 are sufficiently refilled with the hydraulic oil is calculated in advance. The threshold value B is set to the calculated value. When the motor rotation speed Nm is greater than or equal to the threshold value A and the number of rotations N is greater than or equal to the threshold value B, the oil pump 50 ensures stable application of hydraulic pressure that shifts the clutch mechanism 20 from the engagement preparation state to the engagement state. Thus, it is determined that the driving of the oil pump 50 is restored. If the oil pump 50 and the clutch mechanism 20 have configurations such that even when the oil pump 50 is stopped, a sufficient amount of hydraulic oil remains in the oil pump 50 and the clutch mechanism 20, only the comparison of the motor rotation speed Nm with the threshold value A may be determined in step S170.

The controller 100 repeatedly executes the process of S170 until an affirmative determination is made in step S170.

When it is determined that the motor rotation speed Nm is greater than or equal to the threshold value A and the number of rotations N is greater than or equal to the threshold value B (S170: YES), the controller 100 determines whether the request for starting the internal combustion engine 10 is currently present (S180).

If it is determined that the request for starting the internal combustion engine 10 is issued (S180: YES), the controller 100 executes an engagement process that shifts the clutch mechanism 20 from the engagement preparation state to the engagement state (S190).

When the engagement process is started, the controller 100 increases the instruction pressure Cp of the clutch mechanism 20 to be greater than the preparation pressure PP so that the clutch mechanism 20 is set to a half-clutch state. Then, when the engine rotation speed NE is synchronized with the motor rotation speed Nm, the instruction pressure Cp is increased to an engagement pressure KP that allows the clutch mechanism 20 to maintain a complete engagement state.

When the engine rotation speed NE is synchronized with the motor rotation speed Nm, the controller 100 starts fuel injection and ignition of the air-fuel mixture in the internal combustion engine 10.

The controller 100 determines whether the engine start is completed (S210). In the present embodiment, if the engine rotation speed NE is synchronized with the motor rotation speed Nm and the fuel injection and ignition of the air-fuel mixture are performed, the controller 100 determines that the engine start is completed.

The controller 100 repeatedly executes the process of S210 until it is determined in step S210 that the engine start is completed.

If it is determined that the engine start is completed (S210: YES), the controller 100 stops the driving of the electric oil pump 80 (S220) and ends the present process.

If it is determined in S180 that the request for starting the internal combustion engine 10 is not issued (S180: NO), the controller 100 executes a hydraulic pressure reduction process that reduces the hydraulic pressure applied to the clutch mechanism 20 (S200). When the hydraulic pressure reduction process is started, the controller 100 reduces the instruction pressure Cp of the clutch mechanism 20 to a normal pressure that is used in the motor drive mode. The normal pressure used in the motor drive mode is less than the preparation pressure PP and may be, for example, 0 kpa. For example, to ensure the responsiveness of the clutch mechanism 20, the normal pressure may be several dozen kpa. When the hydraulic pressure reduction process is executed, the clutch mechanism 20 changes from the engagement preparation state to the disengagement state.

When the hydraulic pressure reduction process is executed, the controller 100 stops the driving of the electric oil pump 80 (S220) and ends the present process.

Figure 3:
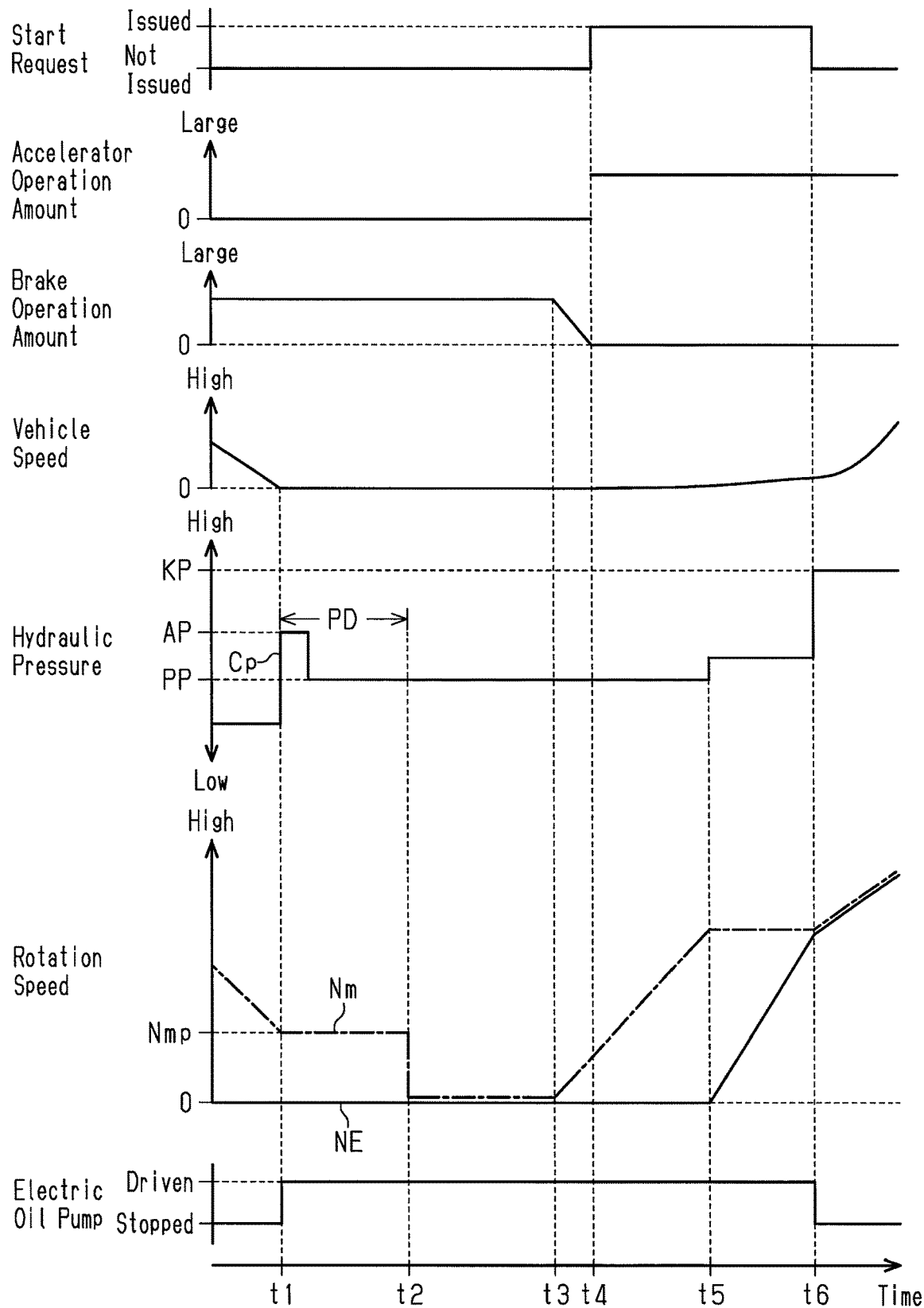
FIG. 3 is a time chart showing the operation of the first embodiment.

FIG. 3 shows an example of the operation obtained in the series of processes. In FIG. 3, before time t1, the motor creep driving is executed, and the running of the internal combustion engine 10 is stopped. In FIG. 3, between time t2 and t3 and from time t6, the engine rotation speed NE that is indicated by the solid line conforms to the motor rotation speed Nm that is indicated by the single-dashed line.

When the brake pedal is depressed, the vehicle speed SP and the motor rotation speed Nm are gradually reduced. When the motor rotation speed Nm is reduced to the pump actuation assurance value Nmp, the motor rotation speed Nm is maintained to be the pump actuation assurance value Nmp to ensure sufficient hydraulic pressure for executing the preparation process. At time t1, when the vehicle speed SP becomes zero, the preparation process is started.

At time t2, when it is determined that the clutch mechanism 20 has been set to the engagement preparation state, the torque reduction process is executed to stop the driving of the electric motor 30. During the execution of the torque reduction process, the hydraulic pressure applied to the clutch mechanism 20 is ensured by the driving of the electric oil pump 80. Thus, even when the driving of the oil pump 50, which is driven by the electric motor 30, is stopped due to execution of the torque reduction process, the clutch mechanism 20 maintains the engagement preparation state.

At time t3, when the brake pedal is released from depression, the restoration process is executed to resume driving the electric motor 30. The motor rotation speed Nm starts to increase from zero.

At time t4, when the accelerator pedal is greatly depressed and the requested torque for driving the vehicle cannot be provided using only the torque of the electric motor 30, the request for starting the internal combustion engine 10 is generated. At time t5, the conditions that the motor rotation speed Nm is greater than or equal to the threshold value A and the number of rotations N is greater than or equal to the threshold value B are satisfied, which determines that the driving of the oil pump 50 is restored. In this state, if the start request is issued, the engagement process is started so that the clutch mechanism 20 shifts from the engagement preparation state to the half-clutch state. As a result, the engine rotation speed NE starts to increase from zero. At time t6, when the engine rotation speed NE is synchronized with the motor rotation speed Nm, the clutch mechanism 20 is set to the complete engagement state. In addition, at time t6, the fuel injection and ignition of the air-fuel mixture are started in the internal combustion engine 10, which determines that the engine start is completed. Thus, the driving of the electric oil pump 80 is stopped.

The present embodiment has the following advantages.

(1) During execution of the torque reduction process, the clutch mechanism 20 is controlled so that the clutch mechanism 20 is in the engagement preparation state. Thus, when shifting the clutch mechanism 20 from the disengagement state to the engagement state based on the request for starting the internal combustion engine 10, the clutch mechanism 20 promptly engages. This allows the engine to be promptly started even when the torque reduction process is executed.

(2) In general, when shifting the clutch mechanism 20 from the disengagement state to the engagement state based on the request for starting the internal combustion engine 10, if the clutch mechanism 20 cannot promptly engage, an increase in the engine rotation speed NE due to cranking may not be balanced with a change in the transmission torque capacity of the clutch mechanism 20, and hesitation may occur. In this regard, in the present embodiment, the clutch mechanism 20 is configured to promptly engage. Thus, occurrence of hesitation is limited.

(3) When the creep restoration condition is satisfied during execution of the torque reduction process, the restoration process is executed to increase torque generated by the electric motor 30 to be greater than torque generated during execution of the torque reduction process. When the restoration process is executed and the rotation speed of the electric motor 30 is increased, the rotation speed of the oil pump 50, which is driven by the electric motor 30, is also increased.

When the request for starting the internal combustion engine 10 is issued after execution of the restoration process, if the condition including the motor rotation speed Nm being greater than or equal to the threshold value A is satisfied, the engagement process is executed to shift the clutch mechanism 20 from the engagement preparation state to the engagement state.

As described above, when the motor rotation speed Nm is greater than or equal to the threshold value A, the oil pump 50 performs the rated operation. This stably ensures the hydraulic pressure that shifts the clutch mechanism 20 from the engagement preparation state to the engagement state. Thus, during execution of the engagement process, the engagement of the clutch mechanism 20 is ensured so that the engine is started.

(4) When a condition including the motor rotation speed Nm being greater than or equal to the threshold value A is satisfied after execution of the restoration process, if the request for starting the internal combustion engine 10 is not issued, the hydraulic pressure reduction process is executed to reduce the hydraulic pressure applied to the clutch mechanism 20. With this configuration, when the request for starting the internal combustion engine 10 is not issued and the clutch mechanism 20 does not have to be in the engagement state, the hydraulic pressure applied to the clutch mechanism 20 is reduced. This reduces energy loss corresponding to the driving of the oil pump 50 as compared to a case in which the hydraulic pressure applied to the clutch mechanism 20 is not reduced and the clutch mechanism 20 maintains the engagement preparation state.

(5) The vehicle 500 includes the electric oil pump 80 that applies hydraulic pressure to the clutch mechanism 20. The electric oil pump 80 is driven so that the clutch mechanism 20 maintains the engagement preparation state. If the electric oil pump 80 is stopped before completion of the engine start, the hydraulic pressure applied to the clutch mechanism 20 is reduced. This may destabilize the engagement state of the clutch mechanism 20 and may, for example, fail to stably start the engine. In this regard, in the present embodiment, when the engine start is completed, the electric oil pump 80 is stopped. This reduces situations that destabilize the engagement state of the clutch mechanism 20.

Second Embodiment

A second embodiment of an on-board controller will now be described with reference to FIG. 4.

Figure 4:
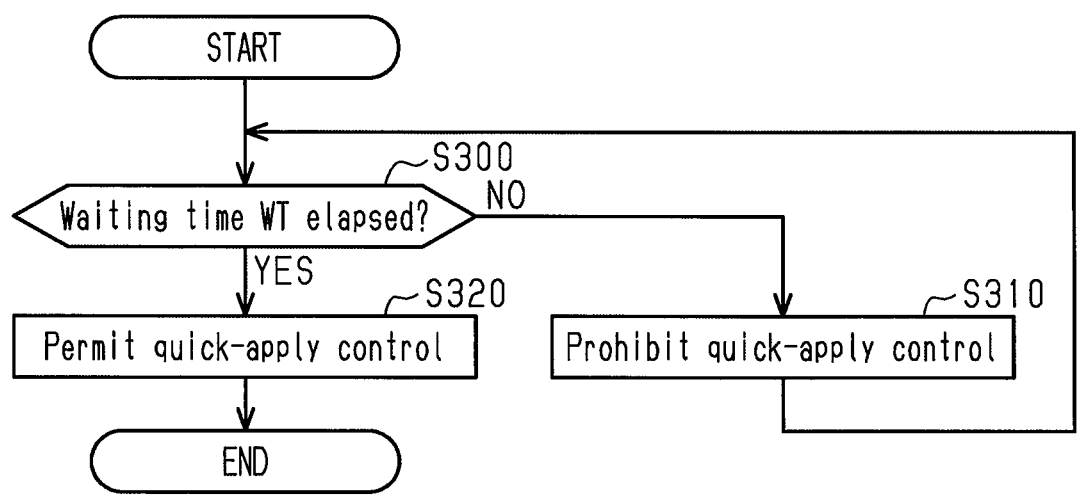
FIG. 4 is a flowchart showing the procedures of a process executed by a second embodiment of an on-board controller.

In the present embodiment, a series of processes shown in FIG. 4 is executed in addition to the series of processes shown in FIG. 2. The second embodiment differs from the first embodiment in this point. The present embodiment will be described focusing on the difference.

When the hydraulic pressure reduction process is executed in step S200 of FIG. 2, the controller 100 starts the series of processes shown in FIG. 4.

As shown in FIG. 4, when starting the process, the controller 100 determines whether a specified waiting time WT has elapsed from when the hydraulic pressure reduction process is executed (S300). The waiting time WT is set in advance to a time taken to reduce the hydraulic pressure of the clutch mechanism 20 after execution of the hydraulic pressure reduction process to a level that needs execution of the quick-apply control. In the present embodiment, the waiting time WT is a fixed value. However, the time taken to decrease the hydraulic pressure of the clutch mechanism 20 shortens as the temperature of the hydraulic oil in the clutch mechanism 20 increases. Thus, the waiting time WT may be variably set so that the value of the waiting time WT decreases as the temperature of the hydraulic oil increases.

If it is determined that the waiting time WT has not elapsed (S300: NO), the controller 100 prohibits execution of the quick-apply control (S310) and returns to the process of S300.

If it is determined that the waiting time WT has elapsed (S300: YES), the controller 100 permits execution of the quick-apply control (S320) and ends the process.

The present embodiment has the following operation and advantages.

(6) The hydraulic pressure partially remains in the clutch mechanism 20 until a certain amount of time elapses from when the hydraulic pressure reduction process is executed. In general, when the pressure remains and a request for engaging the clutch mechanism 20 is generated to execute the quick-apply control, the transmission torque capacity of the clutch mechanism 20 may be overly increased, and a shock may occur when engaging the clutch mechanism 20. In this regard, in the present embodiment, execution of the quick-apply control is prohibited until the specified waiting time WT elapses from when the hydraulic pressure reduction process is executed. This limits occurrence of shocks when engaging the clutch mechanism 20.

Third Embodiment

A third embodiment of an on-board controller will now be described with reference to FIGS. 5 to 7.

In the first embodiment, after the vehicle 500 is stopped, the preparation process is started to set the clutch mechanism 20 to the engagement preparation state. In the present embodiment, the series of processes shown in FIG. 5 is executed so that before the vehicle 500 stops, the preparation process is started. Thus, the clutch mechanism 20 is in the engagement preparation state at the point in time when the vehicle 500 stops. The third embodiment differs from the first embodiment in this point. The present embodiment will be described focusing on the difference.

Figure 5:
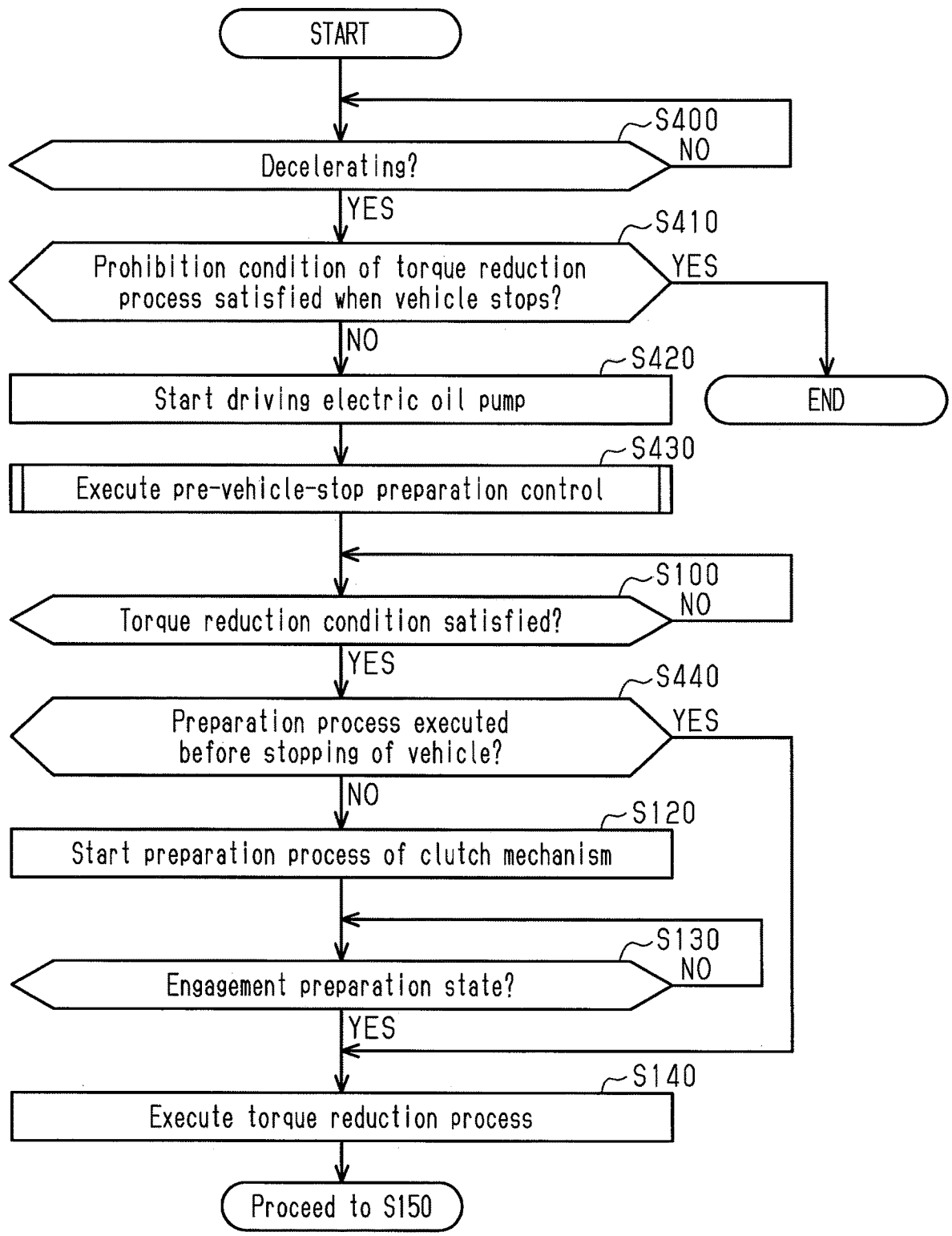
FIG. 5 is a flowchart showing the procedures of a process executed by a third embodiment of an on-board controller.

When the motor creep driving is started, the controller 100 starts the series of processes shown in FIG. 5.

As shown in FIG. 5, when starting the process, the controller 100 determines whether the vehicle 500 is currently decelerating (S400).

The controller 100 repeatedly executes the process of S400 until it is determined that the vehicle 500 is decelerating.

If it is determined that the vehicle 500 is decelerating (S400: YES), the controller 100 determines whether a prohibition condition that prohibits execution of the torque reduction process is satisfied when the vehicle 500 is stopped (S410). The prohibition condition is, for example, set to a case in which the running of the internal combustion engine 10 is stopped during the motor driving and the internal combustion engine 10 is highly likely to be promptly started after the vehicle 500 is stopped. An example of a case in which the engine is highly likely to be promptly started after the vehicle 500 is stopped includes a case in which the charge state SOC of the high voltage battery 300 for driving the vehicle has a value proximate to the charge need value.

If it is determined that the prohibition condition is satisfied when the vehicle 500 is stopped (S410: YES), the controller 100 ends the process. As described above, when an affirmative determination is made in S410, the preparation process is not executed, and execution of the preparation process is prohibited.

If it is determined that the prohibition condition is not satisfied when the vehicle 500 is stopped (S410: NO), the controller 100 starts the driving of the electric oil pump 80 (S420).

The controller 100 executes a pre-vehicle-stop preparation control (S430).

Figure 6:
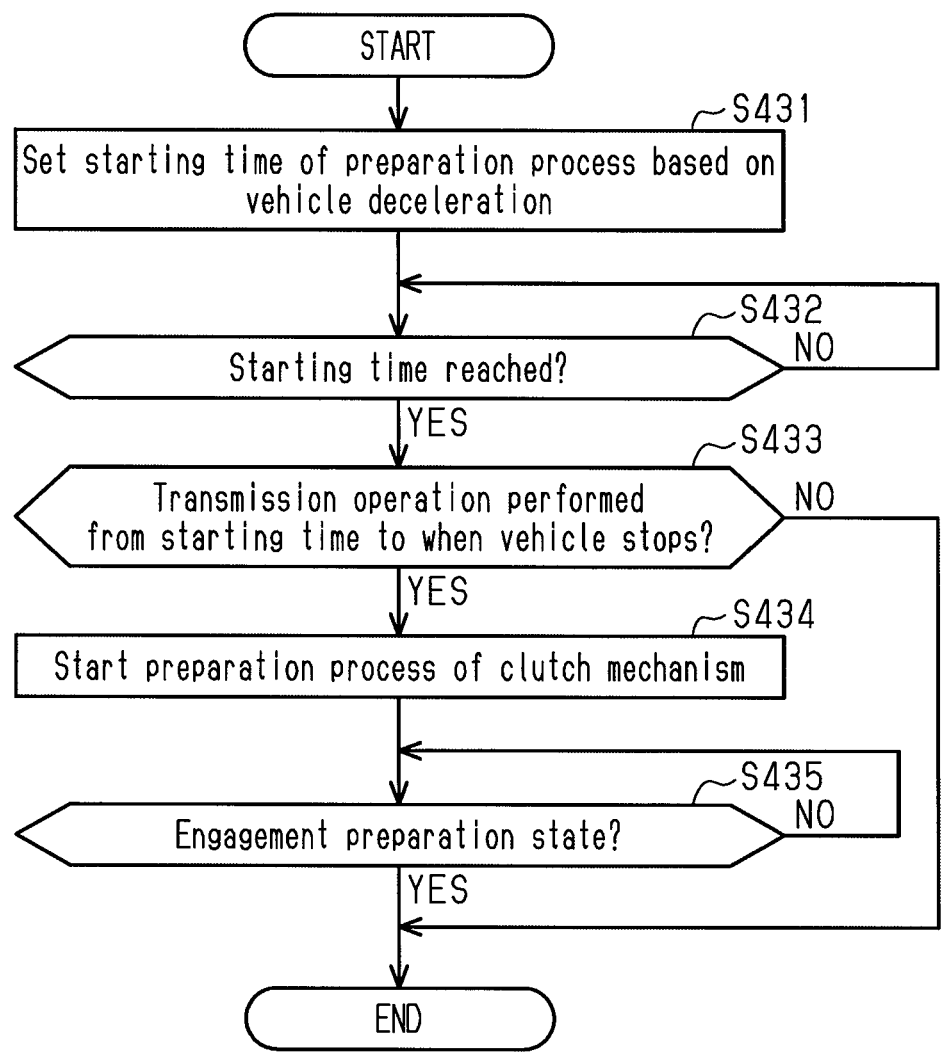
FIG. 6 is a flowchart showing the procedures of a process executed by the on-board controller of the embodiment.

FIG. 6 shows the procedures of the pre-vehicle-stop preparation control.

The controller 100 executes a starting time setting process that sets a time for starting the preparation process based on a deceleration DG of the vehicle 500 calculated from the acceleration G (S431). As the starting time setting process, the controller 100 calculates an estimated time taken to stop the vehicle 500 from the current time based on the deceleration DG. The controller 100 subtracts the time taken to complete the preparation process, that is, the specified time PD, from the estimated time to calculate the starting time of the preparation process.

The controller 100 determines whether the starting time is reached (S432). The controller 100 repeatedly executes the process of S432 until the starting time is reached.

If it is determined that the starting time is reached (S432: YES), the controller 100 determines whether the automatic transmission 40 performs a transmission operation in a period from the starting time to when the vehicle 500 stops (S433). In S433, if the transmission stage of the automatic transmission 40 at the starting time differs from the transmission stage at the time when the vehicle is at a standstill, the controller 100 determines that the automatic transmission 40 performs a transmission operation in the period from the starting time to when the vehicle 500 stops. If the transmission stage of the automatic transmission 40 at the starting time is the same as the transmission stage at the time when the vehicle is at a standstill, the controller 100 determines that the automatic transmission 40 does not perform a transmission operation in the period from the starting time to when the vehicle 500 stops.

If it is determined that the automatic transmission 40 performs the transmission operation (S433: YES), the preparation process before the stopping of the vehicle is not executed, and the controller 100 ends the process.

If it is determined that the automatic transmission 40 does not perform the transmission operation (S433: NO), the controller 100 starts the preparation process of the clutch mechanism 20 (S434). The preparation process of S434 is the same as the preparation process of step S120 described above.

The controller 100 determines whether the clutch mechanism 20 shifts from the disengagement state to the engagement preparation state (S435). The determination process of S435 is the same as the determination process of S130 described above.

The controller 100 repeatedly executes the process of S435 until it is determined that the clutch mechanism 20 has shifted to the engagement preparation state.

If it is determined that the clutch mechanism 20 has shifted to the engagement preparation state (S435: YES), the controller 100 ends the process.

After the execution of the pre-vehicle-stop preparation control shown in FIG. 6, the controller 100 executes the process of step S100 shown in FIG. 2 to determine whether the torque reduction condition is satisfied. The controller 100 repeatedly executes the process of S100 until the torque reduction condition is satisfied.

If it is determined that the torque reduction condition is satisfied (S100: YES), the controller 100 determines whether the preparation process was executed before the stopping of the vehicle, that is, whether the preparation process was executed through execution of the pre-vehicle-stop preparation control (S440).

If it is determined that the preparation process was executed before the stopping of the vehicle (S440: YES), the controller 100 executes the process of S140 shown in FIG. 2 to execute the torque reduction process and then executes the processes from S150 shown in FIG. 2.

If it is determined that the preparation process was not executed before the stopping of the vehicle (S440: NO), the controller 100 executes the processes of S120 and S130 shown in FIG. 2 so that the preparation process is executed after the vehicle 500 is stopped. Then, after executing the process of S140 shown in FIG. 2 to execute the torque reduction process, the controller 100 executes the processes from S150 shown in FIG. 2.

Figure 7:
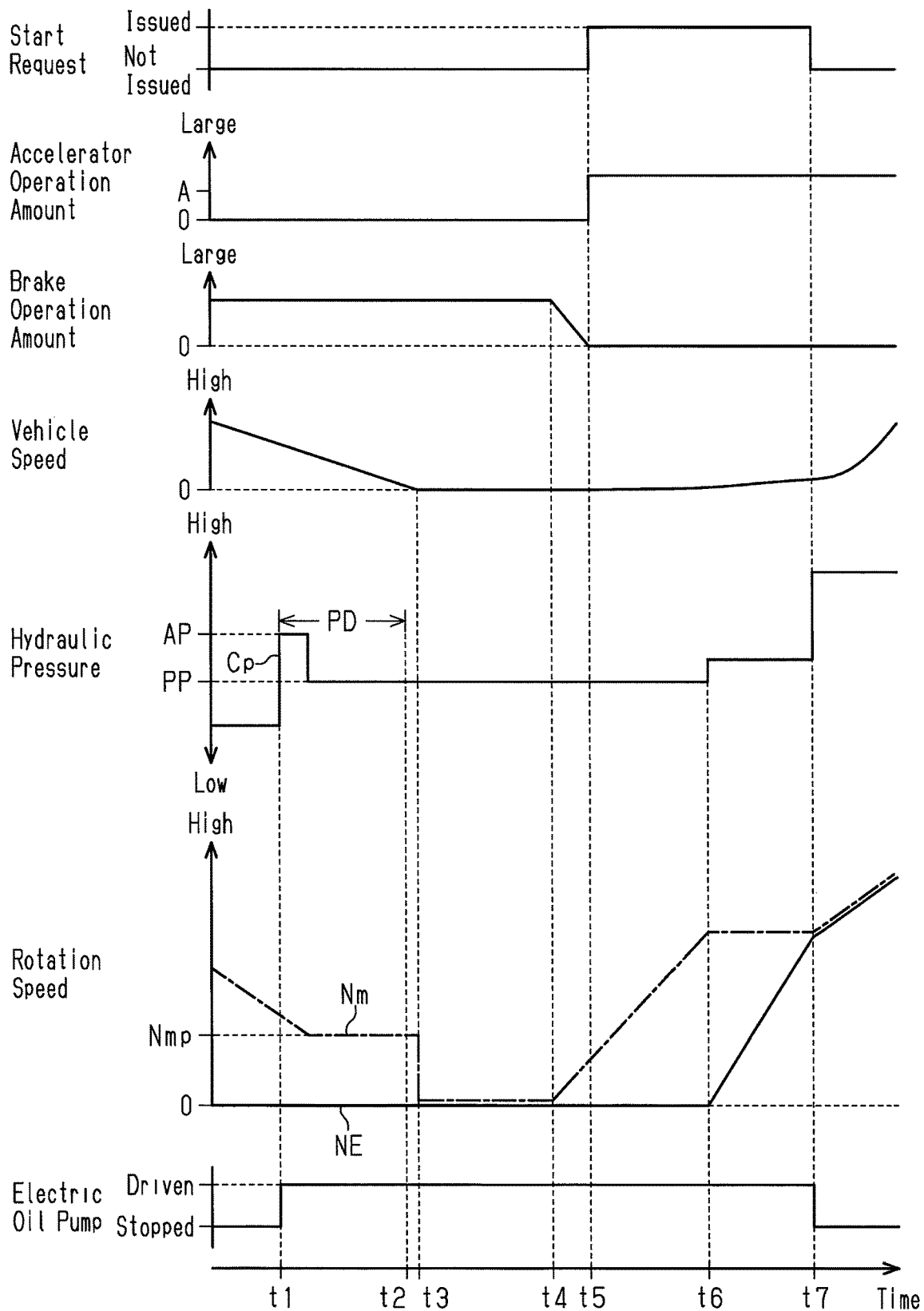
FIG. 7 is a time chart showing the operation of the third embodiment.

FIG. 7 shows an example of the operation obtained in the series of processes. In FIG. 7, before time t1, the motor creep driving is executed, and the running of the internal combustion engine 10 is stopped. In FIG. 7, between time t3 and time t4 and from time t7, the engine rotation speed NE that is indicated by the solid line conforms to the motor rotation speed Nm that is indicated by the single-dashed line.

When the brake pedal is depressed, the vehicle speed SP gradually decreases.

Thus, the vehicle is decelerating. During the deceleration, if a negative determination is made in S410, the electric oil pump 80 starts to be driven, and the pre-vehicle-stop preparation control is executed. If an affirmative determination is made in S432 and a negative determination is made in S433, the preparation process of the clutch mechanism 20 is started (time t1).

When it is determined at time t2 that the clutch mechanism 20 has been set to the engagement preparation state, and the vehicle speed SP becomes zero at time t3, the torque reduction process is executed to stop the driving of the electric motor 30. From time t4, at which the torque reduction process starts to be executed, the same process as described in the first embodiment and shown in FIG. 3 from time t2 is executed.

The present embodiment has the following advantages.

(7) The starting time of the preparation process is set based on the deceleration DG of the vehicle 500 so that the clutch mechanism 20 is in the engagement preparation state at a point in time when the vehicle 500 stops. Since the clutch mechanism 20 is in the engagement preparation state at a point in time when the vehicle 500 stops, the torque reduction process is immediately executed at the point in time when the vehicle 500 stops, as compared to a case in which execution of the torque reduction process is deferred until the clutch mechanism 20 is set to the engagement preparation state from when the vehicle 500 stops. This earlier start of the torque reduction process, for example, reduces power consumption of the electric motor 30 while the vehicle is stopped.

(8) The vehicle may include a transmission that performs a transmission operation using hydraulic pressure of the oil pump driven by the electric motor. The on-board controller may prohibit execution of the preparation process when it is assumed that the transmission performs the transmission operation in a period from the starting time to when the vehicle stops.

In general, in a period from the starting time of the preparation process to when the vehicle 500 stops, if the preparation process is executed when the automatic transmission 40 performs a transmission operation, the hydraulic pressure may become insufficient for the transmission operation of the automatic transmission 40, and the transmission operation may not be appropriately performed.

In this regard, in the present embodiment, when it is determined that the automatic transmission 40 performs a transmission operation in a period from the starting time of the preparation process to when the vehicle 500 stops, execution of the preparation process before the stopping of the vehicle is prohibited. This ensures sufficient hydraulic pressure for use in the transmission operation of the automatic transmission 40.

(9) When the torque reduction process is not executed when the vehicle 500 stops, sufficient hydraulic pressure of the oil pump 50 is ensured even when the vehicle 500 is stopped. Thus, the preparation process does not have to be executed. In this regard, in the present embodiment, if it is determined in S410 that the prohibition condition of the torque reduction process is satisfied when the vehicle 500 is stopped, execution of the preparation process is prohibited. This limits unnecessary execution of the preparation process.

The above-described embodiments may be modified as follows. The embodiments and the following modified examples can be combined as long as the combined modified examples remain technically consistent with each other.

In the first embodiment, before execution of the torque reduction process, the preparation process of the clutch mechanism 20 is executed. Instead, after execution of the torque reduction process, the preparation process of the clutch mechanism 20 may be started. This modified example may be obtained by the processes shown in FIG. 8, which are partially changed from the series of processes shown in FIG. 2.

Figure 8:
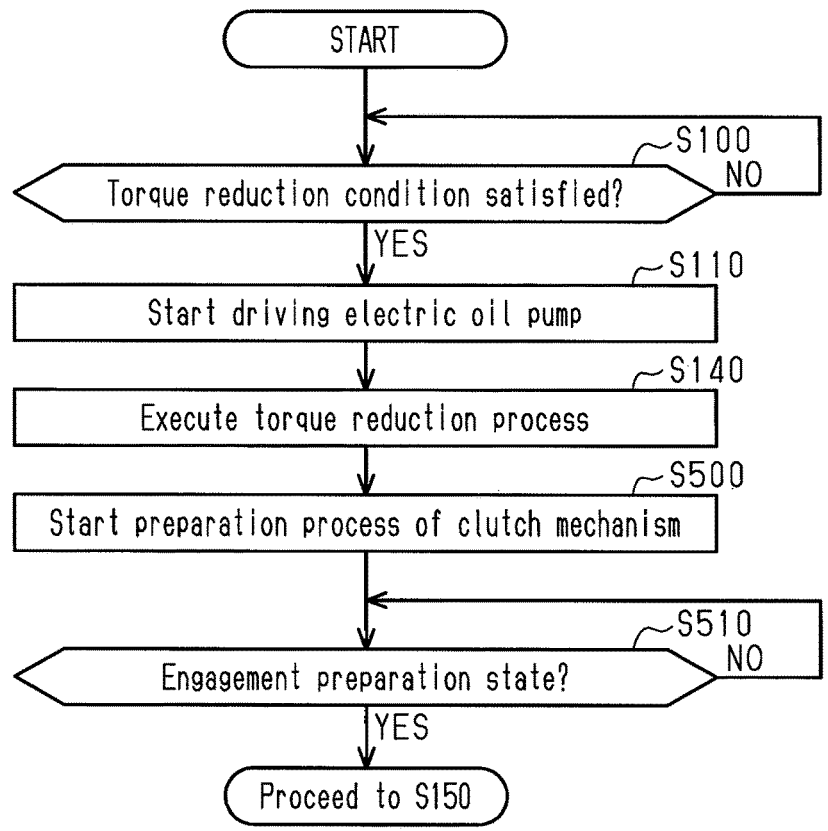
FIG. 8 is a flowchart showing the procedures of a process executed by a modified example of the first embodiment of the on-board controller.

FIG. 8 shows an example of processes obtaining the modified example.

When starting the process, the controller 100 executes the process of S100 to determine whether the torque reduction condition is satisfied.

If it is determined that the torque reduction condition is satisfied (S100: YES), the controller 100 executes the process of S110 to start the driving of the electric oil pump 80.

The controller 100 executes the process of S140 to execute the torque reduction process.

The controller 100 starts the preparation process of the clutch mechanism 20 (S500). The process of S500 is the same as the process of S120.

The controller 100 determines whether the clutch mechanism 20 shifts from the disengagement state to the engagement preparation state (S510). The process of S510 is the same as the process of S130.

If it is determined that the clutch mechanism 20 has shifted to the engagement preparation state (S510: YES), the controller 100 executes the processes from S150 described in the first embodiment.

In the process of S200 shown in FIG. 2, when executing the hydraulic pressure reduction process, the instruction pressure Cp of the clutch mechanism 20 is reduced to the normal pressure used in the motor drive mode. Instead, as the hydraulic pressure reduction process, a process that stops the driving of the electric oil pump 80 may be executed to reduce the hydraulic pressure applied to the clutch mechanism 20. This modified example may be obtained by the processes shown in FIG. 9, which are partially changed from the series of processes shown in FIG. 2.

Figure 9:
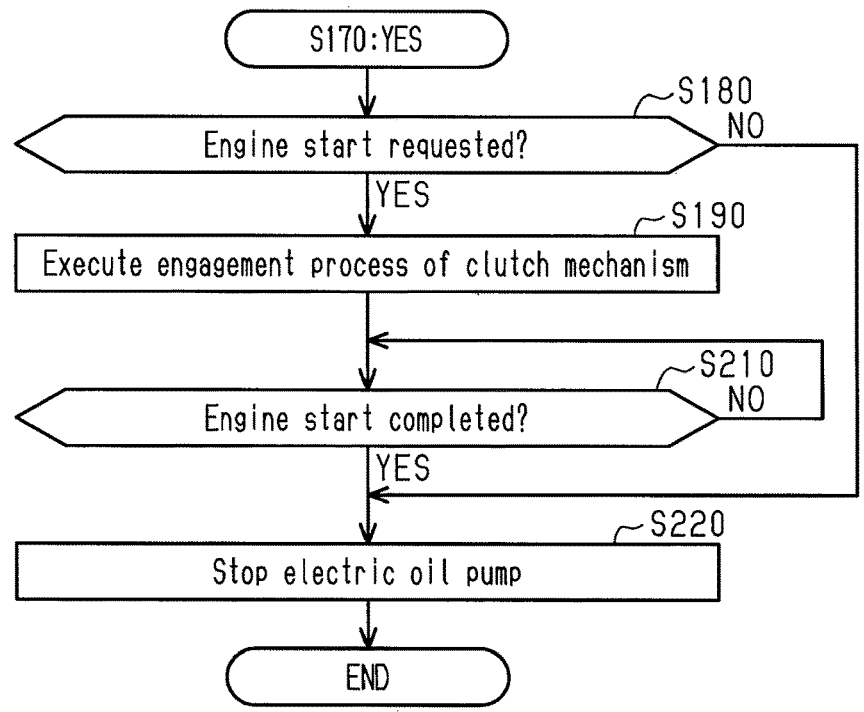
FIG. 9 is a flowchart showing the procedures of a process executed by a modified example of the first embodiment of the on-board controller.

FIG. 9 shows an example of processes obtaining the modified example. The series of processes shown in FIG. 9 is obtained by partially changing the series of processes shown in FIG. 2.

As shown in FIG. 9, if an affirmative determination is made in the process of S170 shown in FIG. 2, the controller 100 executes the process of S180 to determine whether an engine start request is issued. If it is determined that the engine start request is issued (S180: YES), the controller 100 executes the processes of S190, S210, and S220 in the same manner as the first embodiment.

If it is determined that the engine start request is not issued (S180: NO), the controller 100 executes the process of S220 to stop the driving of the electric oil pump 80, which is a process corresponding to the hydraulic pressure reduction process, and ends the process.

In this modified example, when the vehicle 500 resumes the motor drive mode in accordance with execution of the restoration process, power consumption of the electric oil pump 80 is limited.

Figure 10:
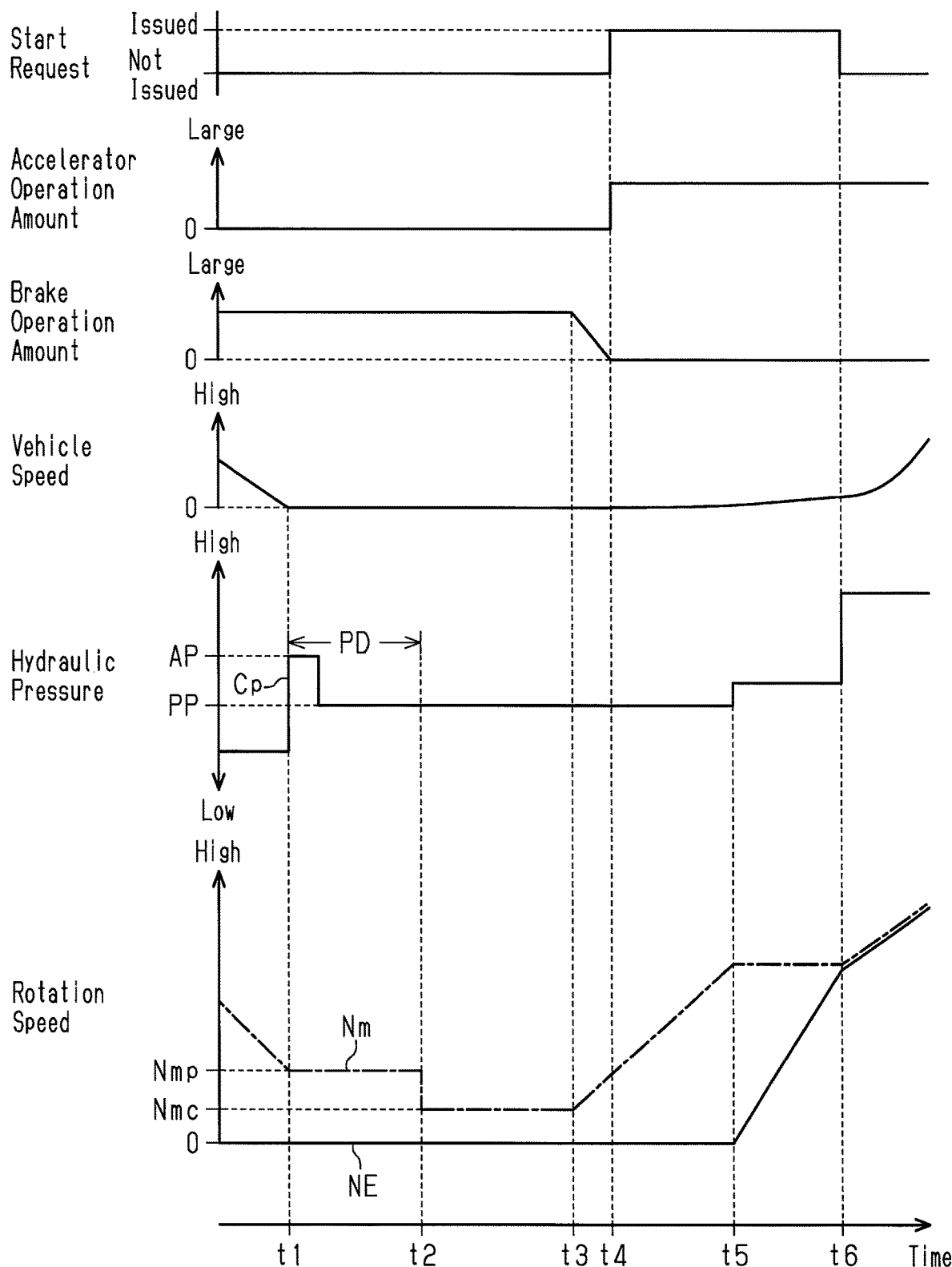
FIG. 10 is a time chart showing the torque reduction process executed by the modified example of the first embodiment of the on-board controller.

The electric oil pump 80 is configured to be driven so that the engagement preparation state of the clutch mechanism 20 is maintained. Instead, the electric oil pump 80 is omitted. In addition, as shown in FIG. 10, in the torque reduction process executed between time t3 and time t4, the following process is executed instead of stopping the driving of the electric motor 30. More specifically, as the torque reduction process, the motor rotation speed Nm may be reduced to a rotation speed Nmc that allows the oil pump 50 to generate a hydraulic pressure that allows the clutch mechanism 20 to maintain the engagement preparation state, and torque generated by the electric motor 30 may be reduced to a torque that maintains the rotation speed Nmc. In this case, the torque reduction process is executed to maintain the engagement preparation state of the clutch mechanism 20.

The determination of comparison between the number of rotations N and the threshold value B may be omitted from the process of S170 shown in FIG. 2.

The time of starting the driving of the electric oil pump 80 may be changed as long as the engagement preparation state is maintained during execution of the torque reduction process.

Before the process of S100 in the first embodiment, the processes of S400 and S410 described in the third embodiment are executed. If an affirmative determination is made in S410, the processes from S100 described in the first embodiment may be executed. In this case, the advantage (9) is obtained.

The process of S433 may be omitted from the third embodiment. In this case, the advantages other than the advantage (8) are obtained.

The process of S410 may be omitted from the third embodiment. In this case, the advantages other than the advantage (9) are obtained.

The on-board controller 100 is not limited to one including the CPU 110 and the memory 120 and configured to execute a software process. For example, at least some of processes executed by software in the embodiments may be executed by a hardware circuit dedicated to execution of these processes (such as ASIC). That is, the on-board controller 100 may be modified as long as it has any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with programs and a dedicated hardware circuit that executes the remaining processes. Configuration (c) includes a dedicated hardware circuit that executes all of the above-described processes. Multiple software processing circuits each including a processor and a program storage device and multiple dedicated hardware circuits may be provided. That is, the above-described processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An on-board controller configured to be mounted on a vehicle, the vehicle including
an internal combustion engine and an electric motor as prime movers,
a hydraulic clutch mechanism, wherein in an engagement state, the clutch mechanism engages an output shaft of the internal combustion engine with an output shaft of the electric motor, and in a disengagement state, the clutch mechanism disengages the output shaft of the internal combustion engine from the output shaft of the electric motor, and
an oil pump driven by the electric motor and configured to apply hydraulic pressure to the clutch mechanism, wherein the on-board controller is configured to execute:
an engine start process that sets the clutch mechanism to the engagement state and drives the electric motor to perform cranking when a start request for the internal combustion engine is issued,
a process that sets the clutch mechanism to the disengagement state and causes the electric motor to generate torque for creep driving to perform motor creep driving, a torque reduction process that reduces torque generated by the electric motor when a brake pedal of the vehicle is depressed and the vehicle is stopped during the motor creep driving, and a preparation process that applies hydraulic pressure to the clutch mechanism during execution of the torque reduction process so that the clutch mechanism is set to an engagement preparation state, wherein a state in which the clutch mechanism is maintained immediately before the engagement state is defined as the engagement preparation state.

2. The on-board controller according to claim 1, wherein
when a specified creep restoration condition is satisfied during execution of the torque reduction process, the on-board controller is configured to execute a restoration process that increases torque generated by the electric motor to be greater than torque generated during execution of the torque reduction process, and when the start request is issued after execution of the restoration process, the on-board controller is configured to execute an engagement process that shifts the clutch mechanism from the engagement preparation state to the engagement state when a rotation speed of the electric motor becomes greater than or equal to a specified threshold value.

3. The on-board controller according to claim 2, wherein after execution of the restoration process, when a rotation speed of the electric motor becomes greater than or equal to the threshold value and the start request is not issued, the on-board controller is configured to execute a hydraulic pressure reduction process that reduces hydraulic pressure applied to the clutch mechanism.

4. The on-board controller according to claim 3, wherein the on-board controller is configured to execute a process that prohibits quick-apply control, which is executed when engaging the clutch mechanism, until a specified time elapses from when the hydraulic pressure reduction process is executed.

5. The on-board controller according claim 1, wherein
the vehicle includes an electric oil pump that applies hydraulic pressure to the clutch mechanism, and
the on-board controller is configured to execute a process that drives the electric oil pump to maintain the engagement preparation state and when an engine start is completed based on the start request, stops the electric oil pump.

6. The on-board controller according claim 1, wherein the torque reduction process includes a process that reduces a rotation speed of the electric motor to a rotation speed that allows the oil pump to generate a hydraulic pressure that maintains the engagement preparation state, and reduces torque generated by the electric motor to a torque that maintains the reduced rotation speed.

7. The on-board controller according claim 1, wherein the on-board controller is configured to execute a starting time setting process that sets a starting time of the preparation process based on a deceleration of the vehicle so that the clutch mechanism is in the engagement preparation state at a point in time when the vehicle stops.

8. The on-board controller according to claim 7, wherein
the vehicle includes a transmission that performs a transmission operation using hydraulic pressure of the oil pump driven by the electric motor, and
the on-board controller is configured to prohibit execution of the preparation process when it is assumed that the transmission performs the transmission operation in a period from the starting time to when the vehicle stops.

9. The on-board controller according claim 1, wherein
the on-board controller is configured to execute a determination process that determines, during deceleration of the vehicle, whether a prohibition condition that prohibits execution of the torque reduction process is satisfied when the vehicle is stopped, and when the determination process determines that the prohibition condition is satisfied when the vehicle is stopped, the on-board controller is configured to prohibit execution of the preparation process.

10. A method for controlling a vehicle, the vehicle including
an internal combustion engine and an electric motor as prime movers,
a hydraulic clutch mechanism, wherein in an engagement state, the clutch mechanism engages an output shaft of the internal combustion engine with an output shaft of the electric motor, and in a disengagement state, the clutch mechanism disengages the output shaft of the internal combustion engine from the output shaft of the electric motor, and
an oil pump driven by the electric motor and configured to apply hydraulic pressure to the clutch mechanism, the method comprising:
an engine start process that sets the clutch mechanism to the engagement state and drives the electric motor to perform cranking when a start request for the internal combustion engine is issued;
a process that sets the clutch mechanism to the disengagement state and causes the electric motor to generate torque for creep driving to perform motor creep driving;
a torque reduction process that reduces torque generated by the electric motor when a brake pedal of the vehicle is depressed and the vehicle is stopped during the motor creep driving; and
a preparation process that applies hydraulic pressure to the clutch mechanism during execution of the torque reduction process so that the clutch mechanism is set to an engagement preparation state, wherein a state in which the clutch mechanism is maintained immediately before the engagement state is defined as the engagement preparation state.

11. An on-board controller configured to be mounted on a vehicle, the vehicle including
an internal combustion engine and an electric motor as prime movers,
a hydraulic clutch mechanism, wherein in an engagement state, the clutch mechanism engages an output shaft of the internal combustion engine with an output shaft of the electric motor, and in a disengagement state, the clutch mechanism disengages the output shaft of the internal combustion engine from the output shaft of the electric motor, and
an oil pump driven by the electric motor and configured to apply hydraulic pressure to the clutch mechanism, the on-board controller, comprising processing circuitry configured to execute
an engine start process that sets the clutch mechanism to the engagement state and drives the electric motor to perform cranking when a start request for the internal combustion engine is issued,
a process that sets the clutch mechanism to the disengagement state and causes the electric motor to generate torque for creep driving to perform motor creep driving, a torque reduction process that reduces torque generated by the electric motor when a brake pedal of the vehicle is depressed and the vehicle is stopped during the motor creep driving, and a preparation process that applies hydraulic pressure to the clutch mechanism during execution of the torque reduction process so that the clutch mechanism is set to an engagement preparation state, wherein a state in which the clutch mechanism is maintained immediately before the engagement state is defined as the engagement preparation state.

\* \* \* \* \*